(12) United States Patent
Araki et al.

(10) Patent No.: US 11,188,455 B2
(45) Date of Patent: Nov. 30, 2021

(54) MEDIA IMPORT AND EXPORT IN STORAGE MANAGEMENT SYSTEMS

(71) Applicant: International Business Machines Corporation, Armonk, NY (US)

(72) Inventors: Hiroshi Araki, Yokohama (JP); Hiroyuki Miyoshi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 16/851,143

(22) Filed: Apr. 17, 2020

(65) Prior Publication Data
US 2021/0326249 A1    Oct. 21, 2021

(51) Int. Cl.
*G06F 12/02* (2006.01)
*G11B 25/06* (2006.01)
*G06F 3/06* (2006.01)

(52) U.S. Cl.
CPC .......... *G06F 12/0223* (2013.01); *G11B 25/06* (2013.01); *G06F 3/0604* (2013.01); *G06F 3/0643* (2013.01); *G06F 3/0685* (2013.01); *G06F 2212/213* (2013.01)

(58) Field of Classification Search
CPC ................. G06F 3/0682; G06F 3/0686; G06F 2212/213; G06F 12/0223; G11B 25/06
See application file for complete search history.

(56) References Cited

U.S. PATENT DOCUMENTS

| 6,718,427 | B1* | 4/2004 | Carlson ................. G06F 3/0617 360/48 |
| 6,816,941 | B1 | 11/2004 | Carlson et al. |
| 7,925,680 | B1* | 4/2011 | Mackrory ............... G06F 16/10 707/812 |
| 9,772,775 | B2 | 9/2017 | Sarafijanovic et al. |
| 2017/0235647 | A1* | 8/2017 | Kilaru ................. G06F 11/1464 707/652 |
| 2018/0059959 | A1* | 3/2018 | Hasegawa ............. G06F 3/0643 |
| 2020/0073574 | A1* | 3/2020 | Pradhan ................... G06F 3/067 |

OTHER PUBLICATIONS

Haustein, N., "An introduction to archive solutions with IBM Spectrum Archive leveraging the Linear Tape File System (LTFS)", Version 4.0, Jun. 21, 2016, 25 pages.
(Continued)

*Primary Examiner* — Charles Rones
*Assistant Examiner* — Hewy H Li
(74) *Attorney, Agent, or Firm* — Jamar K. Ray

(57) ABSTRACT

A computer-implemented method can include obtaining tape data for one or more tapes. The tape data can include pointer data corresponding to a first file. The method can further include determining, based on the tape data, that the first file is stored on a first tape of the one or more tapes. The first tape can have an export status. The method can further include determining that the pointer data includes a pointer to the first tape and a pointer to a second tape. The second tape can have a non-export status. The method can further include storing at least a portion of the tape data. The method can further include initiating, based on the first tape having the export status, a deactivation of the pointer to the first tape.

20 Claims, 9 Drawing Sheets

(56) References Cited

OTHER PUBLICATIONS

Haustein, N., "Introduction to IBM Spectrum Archive™ and Use Cases", IBM, Version 10, © 2016 IBM Corporation, 70 pages.
Oracle, "LTFS Archiving with Oracle Hierarchical Storage Manager 6.0", Oracle Brief, Copyright © 2015, 3 pages.
Mell et al., "The NIST Definition of Cloud Computing", Recommendations of the National Institute of Standards and Technology, Sep. 2011, 7 pages.

* cited by examiner

MEDIA IMPORT AND EXPORT IN STORAGE MANAGEMENT SYSTEMS

BACKGROUND

The present disclosure relates to storage management, and more specifically, to managing the import and/or export of media from a storage management system.

A storage management system, such as a hierarchical storage management system, can manage the storage of computer files onto a variety of types of storage media. For example, in some instances, a storage management system can store computer files onto storage media, such as magnetic disks, optical discs, and magnetic tapes. Additionally, the storage management system can move the computer files between such storage media for cost efficiency and/or efficiency of user access to the computer files. For example, a storage management system can move a seldom-accessed computer file from a magnetic disk to a magnetic tape. In this example, the magnetic tape may be a less expensive storage medium that requires more time for a user to access, compared to the cost and access time for the magnetic disk storage medium. Conversely, in another example, the storage management system can move a highly-accessed computer file from a magnetic tape to a magnetic disk to reduce the amount of time required to access the computer file.

In some instances, a storage medium, such as a magnetic tape, can be exported from a storage management system. For example, such exporting can include a user initiating a physical and/or electronic removal of a magnetic tape from management and/or control by a storage management system. Conversely, in some instances, a storage medium can be imported into a storage management system. For example, such importing can include a user physically and/or electronically placing a magnetic tape under management and/or control by a storage management system.

SUMMARY

According to embodiments of the present disclosure, a computer-implemented method can include obtaining tape data for one or more tapes. The tape data can include pointer data corresponding to a first file. The method can further include determining, based on the tape data, that the first file is stored on a first tape of the one or more tapes. The first tape can have an export status. The method can further include determining that the pointer data includes a pointer to the first tape and a pointer to a second tape. The second tape can have a non-export status. The method can further include storing at least a portion of the tape data. The method can further include initiating, based on the first tape having the export status, a deactivation of the pointer to the first tape.

According to further embodiments of the present disclosure, a computer-implemented method can include obtaining import-tape data for a first tape. The first tape can have an import status. The import-tape data can include a file location for a first stub file. The first stub file can correspond to a first file. The method can further include determining, based on the import-tape data, that the first file is stored on the first tape. The method can further include determining that the first stub file is stored in the file location. The method can further include initiating a change to pointer data included in the first stub file. The change can include modifying the pointer data to include a pointer to the first tape.

According to further embodiments of the present disclosure, a computer-implemented method can include obtaining tape data for one or more tapes. The tape data can include pointer data corresponding to a first file. The method can further include determining, based on the tape data, that the first file is stored on a first tape of the one or more tapes. The first tape can have an export status at a first time. The method can further include determining that the pointer data includes a pointer to the first tape and a pointer to a second tape. The second tape can have a non-export status at a second time. The method can further include storing at least a portion of the tape data. The method can further include initiating, based on the first tape having the export status, a deactivation of the pointer to the first tape. The method can further include obtaining import-tape data for the first tape. The first tape can have an import status. The import-tape data can include a file location for a first stub file. The first stub file can correspond to the first file. The method can further include determining, based on the import-tape data, that the first file is stored on the first tape. The method can further include determining that the first stub file is stored in the file location. The method can further include initiating a change to pointer data included in the first stub file. The change can include modifying the pointer data to include a pointer to the first tape.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
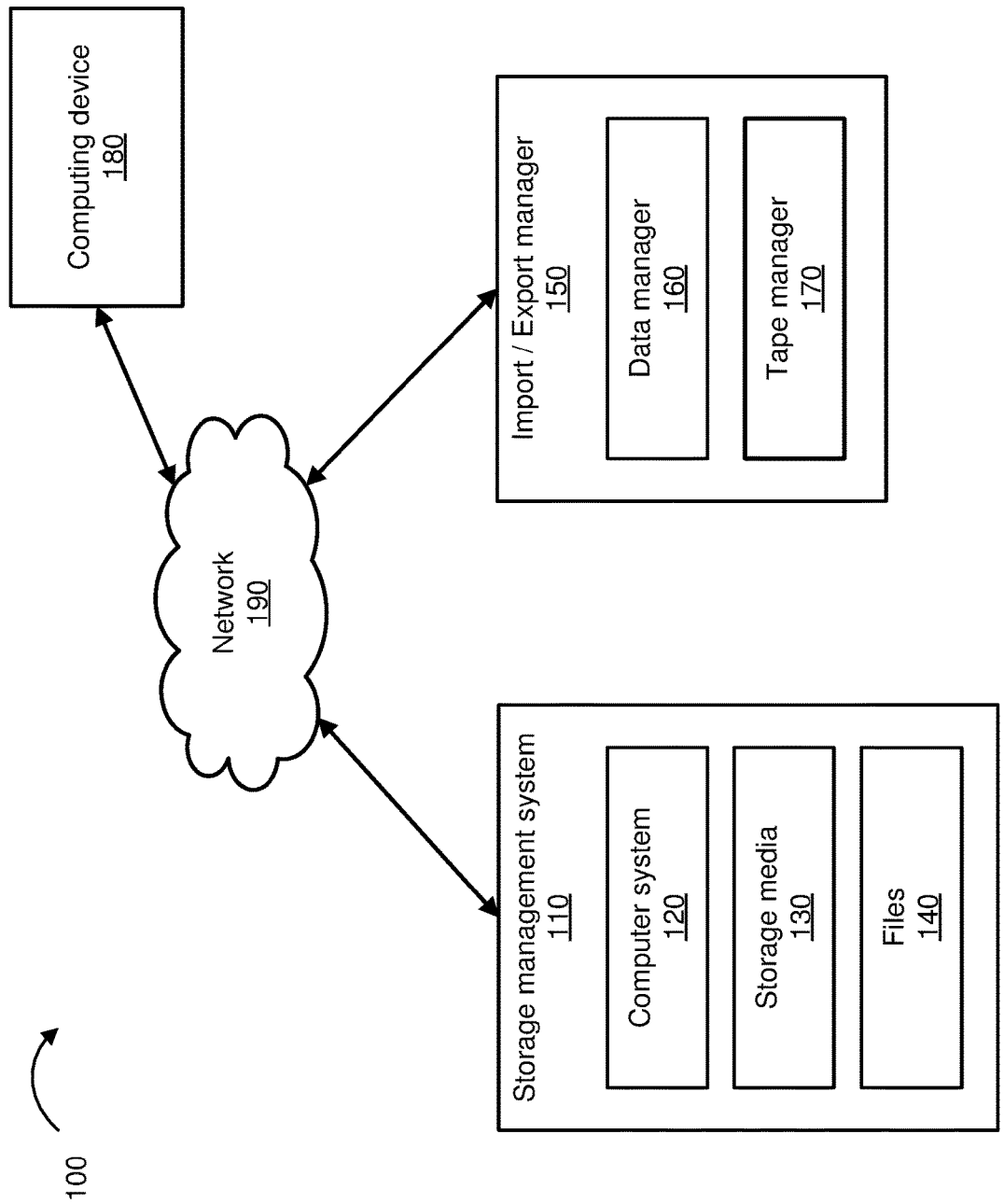
FIG. 1 depicts an example computing environment having an import/export manager, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to storage management; more particular aspects relate to managing the import and/or export of media from a storage management system. While the present disclosure is not necessarily limited to such applications, various aspects of the disclosure may be appreciated through a discussion of various examples using this context.

A storage management system, such as a hierarchical storage management system, can manage the storage of computer files ("files") onto a variety of types of storage media. For example, in some instances, a storage management system can store files onto storage media, such as magnetic disks, solid state drives ("SSD's"), optical discs, and magnetic tapes. Additionally, a storage management system can move files between such storage media, based on criteria such as cost efficiency and/or user accessibility.

File migrate and recall operations:

In some instances, a storage management system can perform a migrate operation and/or a recall operation. In a migrate operation, the storage management system can move a file from a storage medium, such as a SSD, to storage media, such as one or more magnetic tapes. During such a migrate operation, the storage management system can replace the migrated file (e.g., the file moved from the SSD) with a stub file. The stub file can include pointer data that can indicate where a copy of the migrated file can be found (e.g., the pointer data can indicate to the storage management system that a copy of the migrated file can be found on the one or more magnetic tapes).

For example, in some instances, during a migrate operation, a storage management system can move a file from a SSD to two magnetic tapes: a primary magnetic tape and a secondary magnetic tape. Thus, in this example, the primary magnetic tape and the secondary magnetic tape can each store an identical copy of the migrated file. Continuing with this example, during the migrate operation, the storage management system can replace the migrated file with a stub file. The stub file can include pointer data that indicates that the migrated file can be found on the primary magnetic tape and on the secondary magnetic tape.

In a recall operation, the storage management system can move a file from a storage medium, such as a magnetic tape, to a storage medium, such as a SSD. During such a recall operation, the storage management system can use pointer data included in a stub file to find a copy of a file to be recalled. For example, continuing with the example of the migrated file discussed above, during a recall operation, the storage management system can use pointer data of the stub file to determine that a copy of the migrated file can be found on the primary magnetic tape and on the secondary magnetic tape. Additionally, during the recall operation, the storage management system can move a copy of the migrated file from the primary magnetic tape or from the secondary magnetic tape to the SSD.

Media export and import operations:

In some instances, a storage medium, such as a magnetic tape, can be exported from a storage management system. For example, such exporting can include a user initiating a physical and/or electronic removal of a tape from management and/or control by a storage management system. During such an export operation, the storage management system can deactivate and/or delete pointer data corresponding to a tape that is exported. Such pointer data can be deactivated and/or deleted because an exported tape is not under management and/or control by the storage management system; thus, files stored on the exported tape cannot be accessed by the storage management system.

For example, in the example discussed above, in which the storage management system migrates a file from a SSD to a primary tape and a secondary tape, the primary tape can be subsequently exported. Continuing with this example, during the export operation for the primary tape, the storage management system can delete the pointer data that corresponds to the primary tape, as the storage management system cannot access the exported primary tape or the files stored on the exported primary tape. However, the pointer data corresponding to the secondary tape can remain in the stub file to indicate that the storage management system can access the migrated file on the secondary tape.

In some instances, a storage medium can be imported into a storage management system. For example, such importing can include a user physically and/or electronically placing a tape under management and/or control by a storage management system. During such an import operation, the storage management system can create a new stub file for one or more files stored on the tape.

For example, in the example discussed above, in which the storage management system deletes the pointer data corresponding to the primary tape, the primary tape can subsequently be imported. Continuing with this example, during the import operation for the primary tape, the storage management system can create a new stub file for the migrated file. The new stub file can include pointer data that indicates that the migrated file can be found on the imported primary tape. The new stub file can be discrete; thus, the storage management system can include both the original stub file (i.e., the stub file having pointer data that indicates that the migrated file can be found on the secondary tape) and the new stub file (i.e., the stub file having pointer data that indicates that the migrated file can be found on the imported primary tape).

Accordingly, in some instances, exporting and subsequently importing tapes that store migrated files can result in a storage management system creating redundant stub files. Each of such redundant stub files can have pointer data for an identical copy of a migrated file. Such redundant stub files can cause delayed and/or inefficient user accessibility to a migrated file.

For example, in a case in which a stub file includes pointer data for both a primary tape and a secondary tape, the storage management system can seamlessly access a copy of a migrated file stored on the secondary tape if the storage management system encounters a problem accessing a copy of the migrated file stored on the primary tape. In contrast, accessibility to such a migrated file can be delayed in a case involving redundant stub files. For example, if a first discrete stub file includes pointer data for a primary tape on which a migrated file can be found, and a second discrete stub file includes pointer data for a secondary tape on which an identical backup copy of the migrated file can be found, additional time and/or operations may be used by the storage management system to find the second discrete stub file if the storage management system cannot access the primary tape.

Additionally, the creation of such redundant stub files can result in a storage management system having large quantities of stub files, which can unnecessarily consume storage capacity.

To address these and other challenges, embodiments of the present disclosure include an import/export manager. In some embodiments, the import/export manager can facilitate an efficient creation of stub files by a storage management system. More specifically, in some embodiments, the import/export manager can obtain and store tape data corresponding to a tape that is exported from a storage management system. Additionally, in some embodiments, when the tape is subsequently imported into the storage management system, the import/export manager can determine, based at least in part on the stored tape data, whether a stub file corresponding to the imported tape should be modified or if a new stub file should be created. Accordingly, embodiments of the present disclosure can reduce the creation of redundant stub files and facilitate efficient access to files managed and/or controlled by a storage management system.

Turning to the figures, FIG. 1 illustrates a computing environment 100 that includes one or more of each of a storage management system 110, an import/export manager 150, a computing device 180, and/or a network 190. In some embodiments, at least one storage management system 110, import/export manager 150, and/or computing device 180 can exchange data with at least one other through the at least one network 190. For example, in some embodiments, at least one import/export manager 150 can exchange data with at least one storage management system 110 through the at least one network 190. One or more of each of the import/export manager 150, computing device 180, and/or network 190 can include a computer system, such as the computer system 501 discussed with respect to FIG. 5. In some embodiments, the computer system 120 can be identical or substantially similar to the computer system 501 discussed with respect to FIG. 5.

In some embodiments, the import/export manager 150 can be a software application installed on a computer system of at least one of the computing device 180 and/or the storage management system 110. In some embodiments, the import/export manager 150 can be integrated into one or more software applications installed on at least one of the computing device 180 and/or the computer system 120 (e.g., the import/export manager 150 can be included as a plug-in software component of a software application installed on the computer system 120). The import/export manager 150 can include program instructions implemented by a processor, such as a processor of the computer system 120, to perform one or more operations discussed with respect to FIG. 3 and/or FIG. 4. In some embodiments, the storage management system 110 can be identical or substantially similar to the storage management system 205 discussed with respect to FIGS. 2A-2F.

In some embodiments, the import/export manager 150 can include one or more modules, such as a data manager 160 and/or a tape manager 170. In some embodiments, the data manager 160 and the tape manager 170 can be integrated into a single module. In some embodiments, the data manager 160 can obtain, analyze, store, and/or initiate storage of data. In some embodiments, the tape manager can initiate importing and/or exporting storage media 130 from the storage management system 110. In some embodiments, one or more of the data manager 160 and/or the tape manager 170 can include program instructions implemented by a processor, such as a processor of the computer system 120, to perform one or more operations discussed with respect to FIG. 3 and/or FIG. 4. For example, in some embodiments, the data manager 160 can include program instructions to perform operations 305-340, FIG. 3 and/or operations 405-435, FIG. 4. In some embodiments, the tape manager 170 can include program instructions to perform operations 345, FIG. 3 and/or 440, FIG. 4.

In some embodiments, the storage management system 110 can include one or more computer systems 120, storage media 130, and/or files 140. The storage management system 110 employs an import/export manager 150. In some embodiments, the storage management system 110 employs an import/export manager 150 that is integrated into the storage management system 110 (e.g., the import/export manager 150 can be a software application installed on computer system 120). In some embodiments, the storage management system 110 employs an import/export manager 150 that is discrete from the storage management system 110 (e.g., the import/export manager 150 can be a software application installed on a discrete computing device, such as computing device 180).

In some embodiments, storage media 130 can include devices, such as magnetic disks, optical discs, magnetic tapes ("tapes"), and/or SSD's, that can store electronic data, such as files 140. Files 140 can include one or more computer files, such as text files, documents, audio and/or video files, and/or digital images.

In some embodiments, computing device 180 can include a device, such as a computer and/or a server. In some embodiments, the network 190 can be a wide area network (WAN), a local area network (LAN), the internet, or an intranet. In some embodiments, the network 190 can be identical or substantially similar to cloud computing environment 50 discussed with respect to FIG. 6.

Figure 2A:
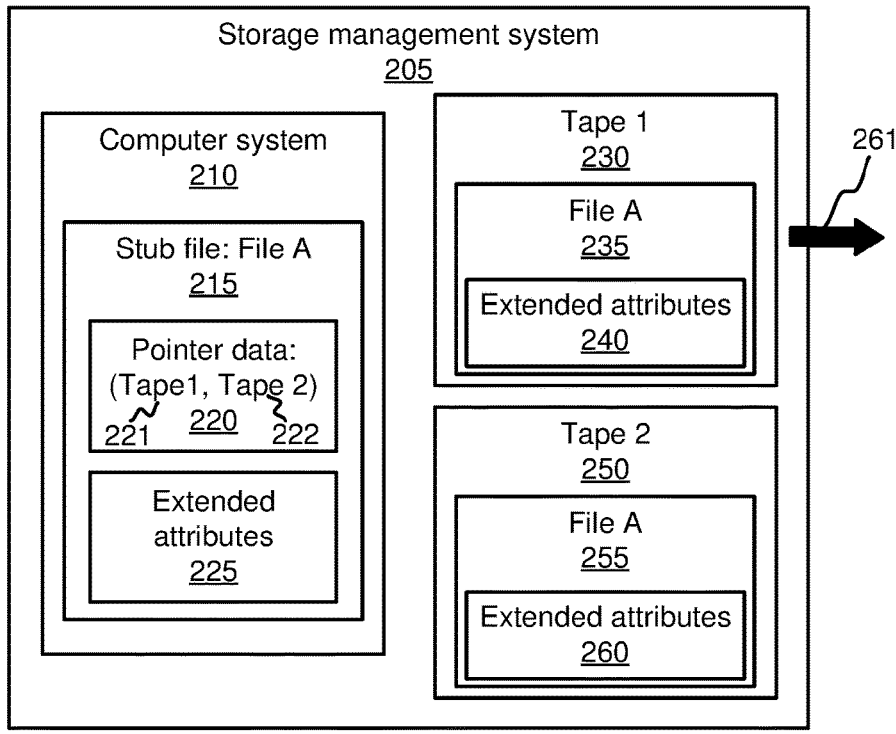
FIG. 2A depicts an example storage management system with a tape having an export status, in accordance with embodiments of the present disclosure.
Figure 2B:
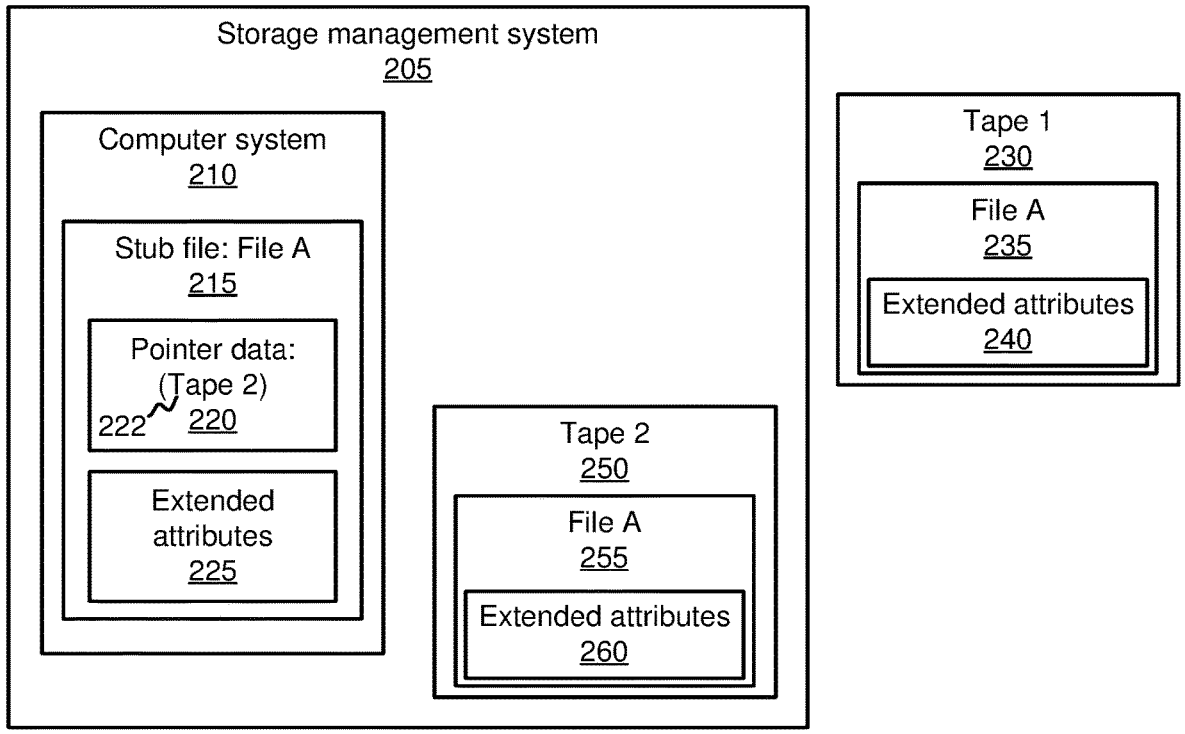
FIG. 2B depicts the example storage management system of FIG. 2A and an exported tape, in accordance with embodiments of the present disclosure.
Figure 2C:
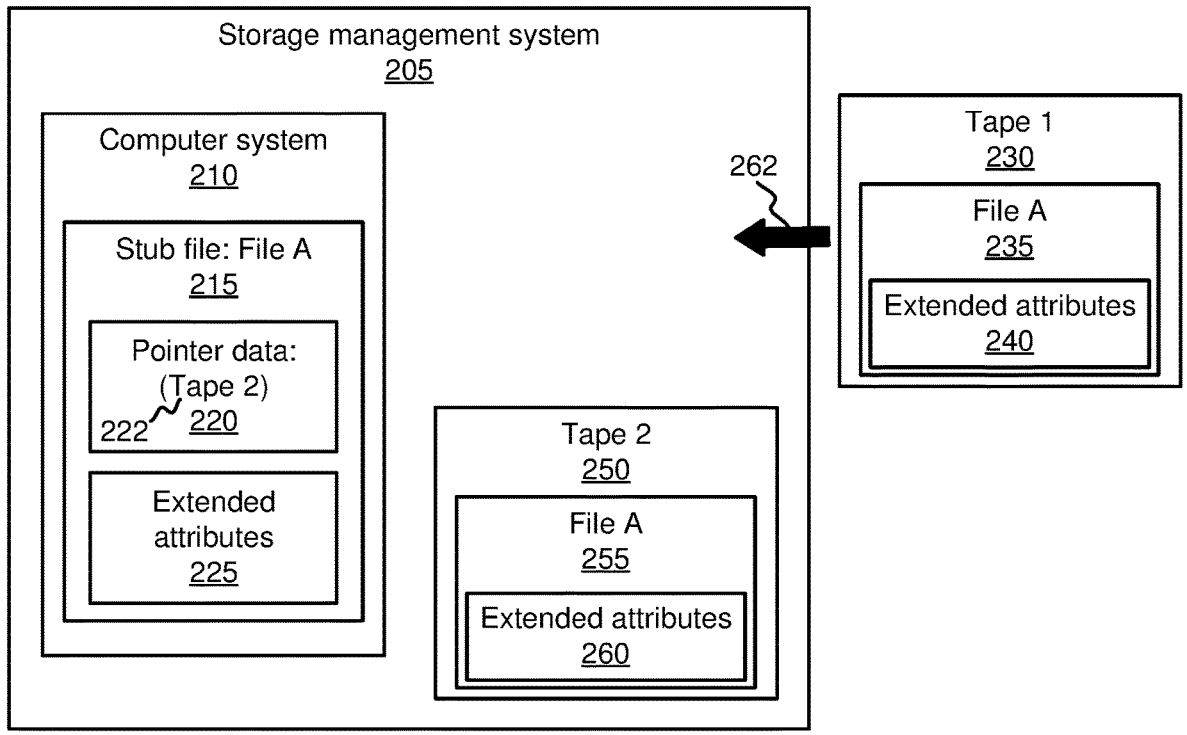
FIG. 2C depicts the example storage management system of FIG. 2B with a tape having an import status and storing a file that has an unmodified status, in accordance with embodiments of the present disclosure.
Figure 2D:
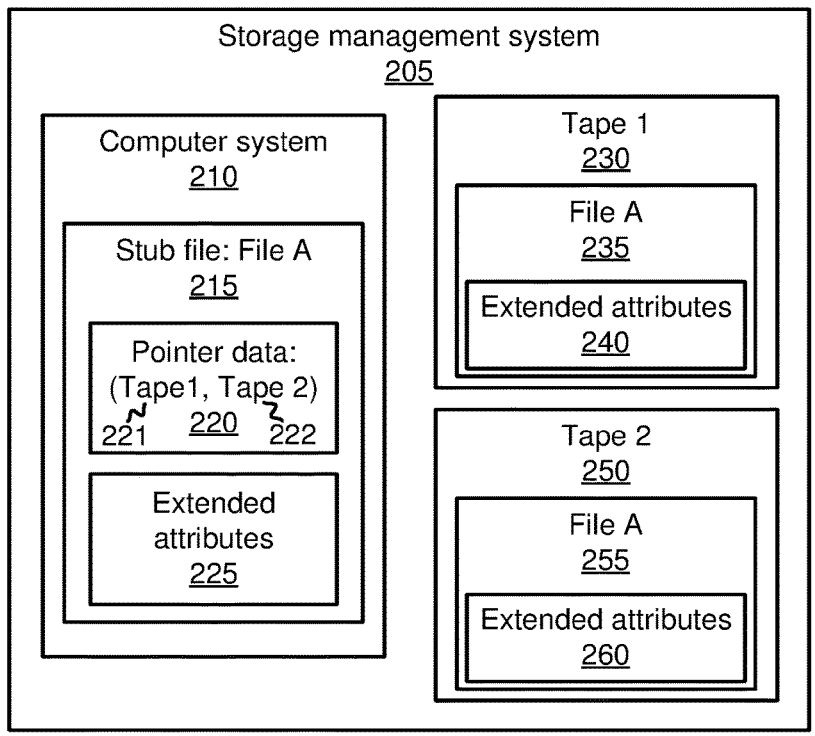
FIG. 2D depicts the example storage management system of FIG. 2C with an imported tape storing a file that has an unmodified status, in accordance with embodiments of the present disclosure.
Figure 2E:
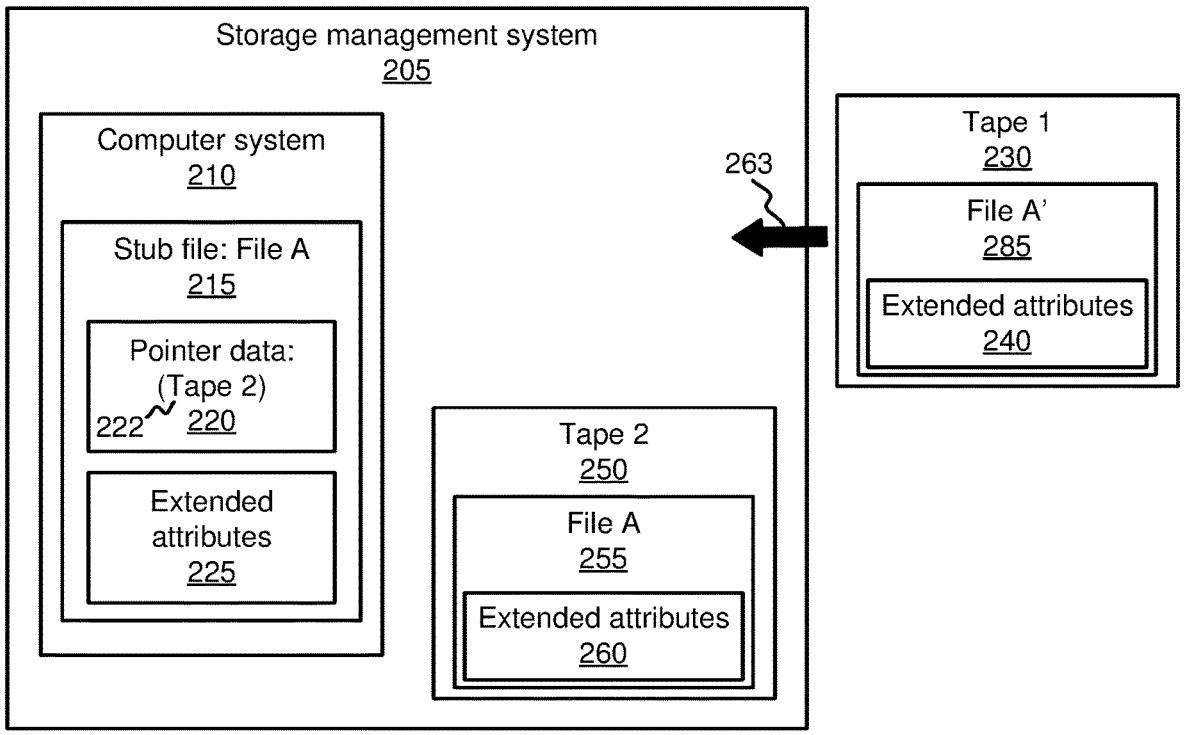
FIG. 2E depicts the example storage management system of FIG. 2B with a tape having an import status and storing a file that has a modified status, in accordance with embodiments of the present disclosure.
Figure 2F:
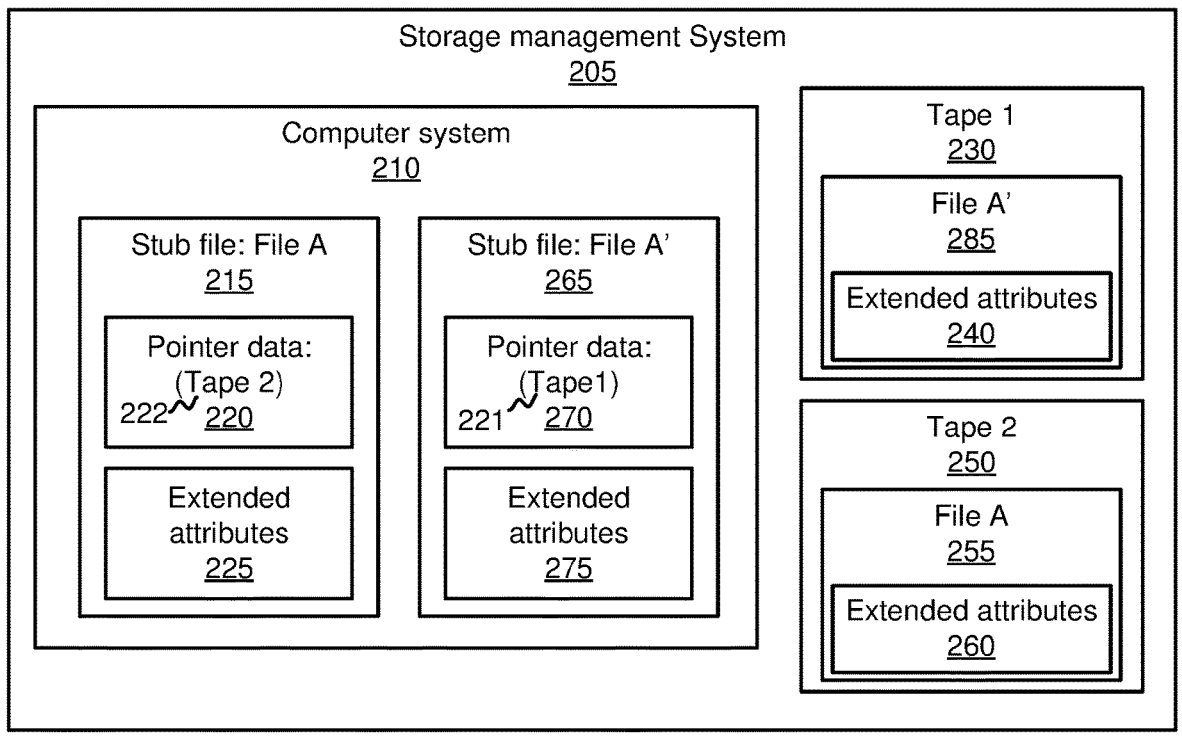
FIG. 2F depicts the example storage management system of FIG. 2E with an imported tape storing a file that has a modified status, in accordance with embodiments of the present disclosure.

FIGS. 2A-2F illustrate a storage management system 205 performing import and export operations, according to embodiments of the present disclosure. Particularly, FIGS. 2A and 2B illustrate the storage management system 205 exporting a tape; FIGS. 2C and 2D illustrate the storage management system 205 importing the tape in a case in which the tape stores a file that has an unmodified status; and FIGS. 2E and 2F illustrate the storage management system 205 importing the tape in a case in which the tape stores a file that has a modified status, according to embodiments of the present disclosure. The storage management system 205 employs an import/export manager, such as import/export manager 150, FIG. 1. In some embodiments, the storage management system 205 can be identical or substantially similar to the storage management system 110, FIG. 1. In some embodiments, the computer system 210 can be identical or substantially similar to the computer system 120, FIG. 1 and/or 501, FIG. 5.

FIG. 2A illustrates storage management system 205, including a computer system 210, tape 1 230, and tape 2 250, in accordance with embodiments of the present disclosure.

In some embodiments, tape 1 230 and tape 2 250 can be tapes for data storage. The computer system 210 stores a stub file 215. The stub file 215 corresponds to a first copy of file A 235, stored on tape 1 230. The stub file 215 also corresponds to a second copy of file A 255 stored on tape 2 250. The stub file 215 includes pointer data 220 and extended attributes 225. The pointer data 220 can include information, such as one or more pointers, that indicates where the storage management system 205 can find a copy of file. For example, in some embodiments, pointer data 220 can include information that indicates that the storage management system 205 can find a copy of file A on tape 1 230 and/or on tape 2 250. Pointer data 220 includes a first pointer 221 that can direct the storage management system 205 to tape 1 230 to access file A 235. Pointer data 220 also includes a second pointer 222 that can direct the storage management system 205 to tape 2 250 to access file A 255. In some embodiments, first pointer 221 and second pointer 222 can include information, such as one or more storage locations, storage addresses, and/or media identification information (e.g., one or more identifying barcodes of one or more tapes), that indicates to the storage management system 205 that file A 235 can be found on tape 1 230 and/or that file A 255 can be found on tape 2 250.

One or more of stub file 215, file A 235, and/or file A 255 can include extended attributes, respectively, 225, 240, and 260. Extended attributes 225, 240, and 260 can include descriptive data (e.g., metadata) added to a file by an entity such as a user or the storage management system 205. In some embodiments, the storage management system 205 can store data (e.g., file location data, tape identification data, and/or file modification data (not shown)) to extended attributes 225, 240, and/or 260.

For example, in some embodiments, when exporting tape 1 230, the storage management system 205 can store tape identification data for tape 1 230 and/or file modification data for file A 235 to extended attributes 225. In some embodiments, tape identification data can include information that the storage management system 205 can use to identify a tape. For example, in some embodiments, tape identification data can include one or more of an alphanumeric name or code, a set of symbols, and/or a barcode. In some embodiments, file modification data can include information about changes made to a file. For example, in some embodiments, file modification data can include a time and/or date on which a most recent modification (e.g., an addition or removal of data) was made to a file. Accordingly, in some embodiments, a file can have a modified status when file modification data indicates that a change was made to the file. In contrast, in some embodiments, a file can have an unmodified status when file modification data indicates that no change was made to the file. As discussed in more detail below, in some embodiments, the storage management system 205 can determine whether a new stub file should be created, based at least in part on the tape identification data and/or the file modification data.

In some embodiments, when exporting tape 1 230, the storage management system 205 can store stub file location data to extended attributes 240. In some embodiments, stub file location data can include information that indicates where a stub file is stored within the storage management system 205. For example, in some embodiments, stub file location data can include a path, such as a full path, to a stub file that is stored on a computer system (e.g., computer system 210). As discussed in more detail below, in some embodiments, the storage management system 205 can determine whether a new stub file should be created, based at least in part on the stub file location data.

In FIG. 2A, arrow 261 indicates that tape 1 230 has an export status. In some embodiments, an export status can indicate that an entity, such as a user or the storage management system 205, has selected the storage medium (e.g., tape 1 230) to be exported from the storage management system 205. In contrast, tape 2 250 has a non-export status; thus, tape 2 250 has not been selected by an entity, such as a user or the storage management system 205, to be exported from the storage management system 205.

FIG. 2B illustrates the storage management system 205 and an exported tape 1 230. Since tape 1 230 is exported, it is not under management and/or control by the storage management system 205; thus, the storage management system 205 cannot read and/or write data to tape 1 230. Accordingly, the storage management system 205 has deactivated first pointer 221, as the storage management system cannot access file A 235. In some embodiments, deactivation of a pointer can include removing a pointer from pointer data 220 (e.g., the storage management system 205 can delete pointer 221 from pointer data 220). Additionally in FIG. 2B, tape 2 250 is not exported; thus, the storage management system can read and/or write data to tape 2 250. Accordingly, pointer data 220 includes pointer 222, as the storage management system can access file A 255.

FIG. 2C illustrates the storage management system 205 and an exported tape 1 230. Arrow 262 indicates that tape 1 230 has an import status. In some embodiments, an import status can indicate that an entity, such as a user or the storage management system 205, has selected the storage medium (e.g., tape 1 230) to be imported into the storage management system 205.

In some embodiments, when importing tape 1 230, the storage management system 205 can obtain data such as file location data (e.g., stub file location data) from extended attributes 240. In some embodiments, the storage management system 205 can further obtain tape identification data and/or file modification data from extended attributes 225. In some embodiments, the storage management system 205 can determine whether to modify stub file 215 or to create a new stub file, based at least in part on one or more of the file location data, tape identification data, and/or file modification data.

For example, in some embodiments, when importing tape 1 230, the storage management system 205 can use file location data from extended attributes 240 to find stub file 215 stored on computer system 210. Continuing with this example, the storage management system 205 can determine that extended attributes 225 includes tape identification data for tape 1 230. Accordingly, the storage management system 205 can verify that stub file 215 corresponds to file A 235, which is stored on tape 1 230. Continuing with this example, the storage management system 205 can use file modification data from extended attributes 225 to determine that file A 235 has an unmodified status. Thus, in this example, the storage management system 205 can determine that stub file 215 should be modified to include a pointer to tape 1 230.

FIG. 2D illustrates the storage management system 205 of FIG. 2C and an imported tape 1 230. Continuing with the example discussed above in which file A 235 has an unmodified status, the storage management system 205 can modify stub file 215 such that the pointer data 220 includes first pointer 221, which can direct the storage management system 205 to tape 1 230 to access file A 235. Accordingly, in this example, based on the pointer data 220, the storage management system 205 can access a copy of file A 235, 255 on tape 1 230 and/or tape 2 250.

FIG. 2E illustrates the storage management system 205 and an exported tape 1 230. Arrow 263 indicates that tape 1 230 has an import status. FIG. 2E is substantially similar to FIG. 2C except that file A 235 has been modified, resulting in file A' 285. Accordingly, in some embodiments, when importing tape 1 230, the storage management system 205 can determine to create a new stub file, based at least in part on file modification data from extended attributes 225.

For example, in some embodiments, when importing tape 1 230, the storage management system 205 can use file location data from extended attributes 240 to find stub file 215 stored on computer system 210. Continuing with this example, the storage management system 205 can determine that extended attributes 225 includes tape identification data for tape 1 230. Accordingly, the storage management system 205 can verify that stub file 215 corresponds to file A' 285, which is stored on tape 1 230. Continuing with this example, the storage management system 205 can use file modification data from extended attributes 225 to determine that file A 235 has a modified status (e.g., that file A 235 was modified after tape 1 230 was exported and before tape 1 230 is imported, resulting in file A' 285). Thus, in this example, the storage management system 205 can determine that a new stub file should be created on the computer system 210. The new stub file can include pointer data that can direct the storage management system 205 to file A' 285 on tape 1 230.

FIG. 2F illustrates the storage management system 205 of FIG. 2E and an imported tape 1 230. Continuing with the example discussed above regarding the storage management system 205 determining that a new stub file should be created, the storage management system 205 can create stub file 265. Stub file 265 can include pointer data 270 that includes a first pointer 221, which can direct the storage management system 205 to tape 1 230 to access file A' 285. Additionally, in some embodiments, stub file 265 can include extended attributes 275.

Figure 3:
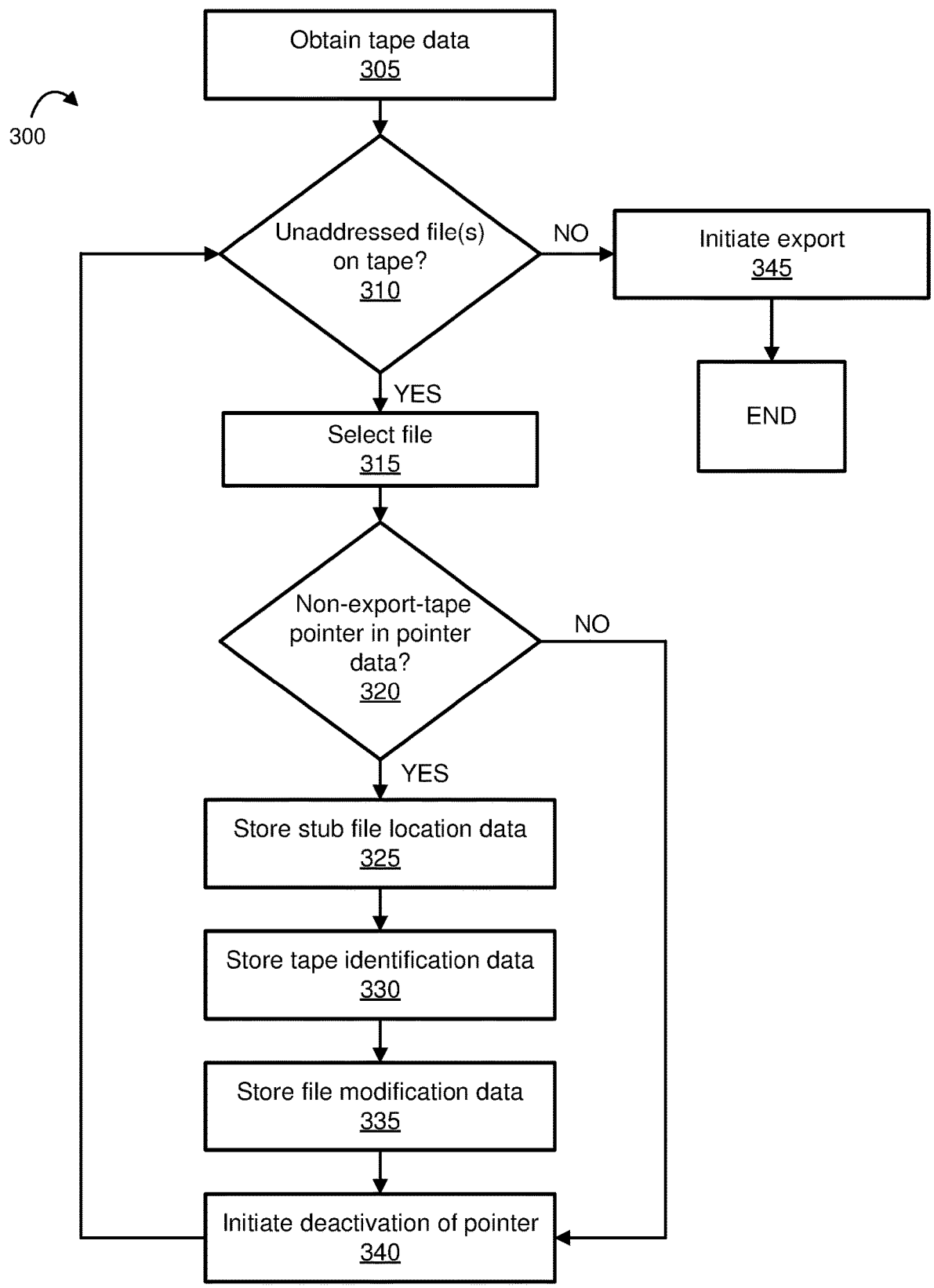
FIG. 3 depicts a flowchart of an example method for managing the export of media from a storage management system, in accordance with embodiments of the present disclosure.

FIG. 3 illustrates a flowchart of an example method 300 for managing the export of media from a storage management system, in accordance with embodiments of the present disclosure. The method 300 can be performed by an import/export manager, such as the import/export manager 150, FIG. 1.

Referring back to FIG. 3, in operation 305, the import/export manager can obtain tape data. In some embodiments, tape data can include information corresponding to one or more tapes, such as stub file location data, tape identification data, file modification data, pointer data, data regarding one or more files stored on one or more tapes, tape status (e.g., export status, non-export status, and/or import status) and/or metadata, such as extended attributes. In some embodiments, the import/export manager can obtain tape data from a storage management system, such as storage management system 110, FIG. 1. In some embodiments, the import/export manager can obtain tape data from a computing device, such as computing device 180, FIG. 1.

In operation 310, the import/export manager can determine, based on the tape data obtained in operation 305, whether one or more unaddressed files are stored on a tape having an export status. A tape having an export status can refer to a tape selected by an entity, such as a user or a storage management system, to be exported from a storage management system. An unaddressed file stored on such a tape can refer to a file for which the import/export manager has not performed operation 320. If one or more unaddressed files are stored on the tape having the export status, then the import/export manager can proceed to operation 315. Alternatively, if no unaddressed files are stored on the tape having the export status, then the import/export manager can proceed to operation 345 and subsequently end.

In operation 345, the import/export manager can initiate an export of the tape having the export status from the storage management system. For example, in some embodiments, initiating an export can include the import/export manager issuing a command to the storage management system to cease control and/or management of the tape.

In operation 315, the import/export manager can select a file stored on the tape having the export status. In some embodiments, selecting a file can include the import/export manager identifying a file for which the import/export manager can perform one or more of operations 320 through 340, discussed below.

In operation 320, the import/export manager can determine whether pointer data corresponding to the selected file includes a pointer to a tape that has a non-export status in addition to a pointer to the tape having the export status. A tape having a non-export status can refer to a tape that has not been selected by an entity, such as a user or a storage management system, to be exported from a storage management system. In some embodiments, operation 320 can include the import/export manager accessing a stub file corresponding to the selected file. The stub file can include pointer data. If the pointer data does not include a pointer to a tape that has a non-export status, then the import/export manager can proceed to operation 340. Alternatively, if the pointer data includes a pointer to a tape that has a non-export status, then the import/export manager can proceed to operation 325.

In operation 325, the import/export manager can store stub file location data. In some embodiments, stub file location data can include a path, such as a full path, to a stub file that is stored on a computer system (e.g., computer system 120, FIG. 1). In some embodiments, operation 325 can include the import/export manager storing the stub file location data to the tape having the export status. Additionally, in such embodiments, the import/export manager can store the stub file location data to extended attributes of the selected file.

In operation 330, the import/export manager can store tape identification data (e.g., an alphanumeric name or code, a set of symbols, and/or a barcode) that can be used to identify the tape having the export status. In some embodiments, operation 330 can include the import/export manager storing the tape identification data to extended attributes of a stub file. In some embodiments, the stub file can be stored on a computer system (e.g., computer system 120, FIG. 1).

In operation 335, the import/export manager can store file modification data (e.g., a timestamp corresponding to a time and/or a date on which a change was made to a file) corresponding to the selected file. In some embodiments, operation 335 can include the import/export manager storing the file modification data to extended attributes of a stub file. In some embodiments, the stub file can be stored on a computer system (e.g., computer system 120, FIG. 1).

In operation 340, the import/export manager can initiate a deactivation of a pointer corresponding to the tape having the export status. In some embodiments, initiating a deactivation of a pointer can include the import/export manager issuing a command to the storage management system to delete a pointer corresponding to the tape having the export status.

Figure 4:
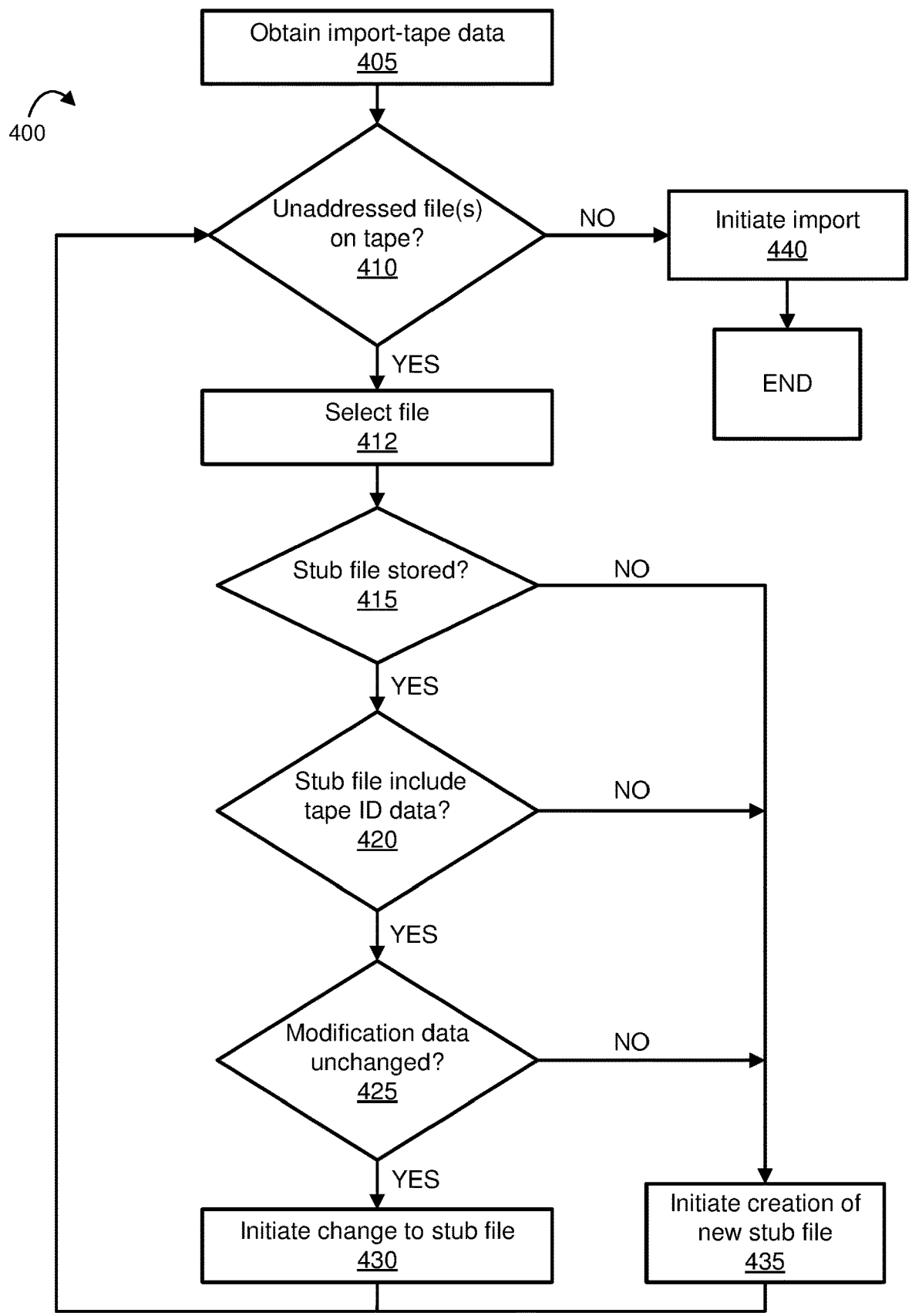
FIG. 4 depicts a flowchart of an example method for managing the import of media into a storage management system, in accordance with embodiments of the present disclosure.

FIG. 4 illustrates a flowchart of an example method 400 for managing the import of media into a storage management system, in accordance with embodiments of the present disclosure. The method 400 can be performed by an import/export manager, such as the import/export manager 150, FIG. 1. In some embodiments, the import/export manager can perform method 400 after performing method 300. For example, in some embodiments, the import/export manager can manage an export of a tape at a first time, according to method 300, and the import/export manager can manage an import of the tape at a second, subsequent time, according to method 400. In this example, the tape has an export status at the first time, and the tape has an import status at the second, subsequent time.

Referring back to FIG. 4, in operation 405, the import/export manager can obtain import-tape data. In some embodiments, import-tape data can include data corresponding to a tape having an import status (e.g., a tape selected by an entity, such as a user or a storage management system, to be imported into a storage management system). For example, in some embodiments, import-tape data can include information such as stub file location data, tape identification data, file modification data, pointer data, tape status, data regarding one or more files stored on the tape having the import status, and/or metadata, such as extended attributes. In some embodiments, the import/export manager can obtain import-tape data from a storage management system, such as storage management system 110, FIG. 1. In some embodiments, the import/export manager can obtain import-tape data from a computing device, such as computing device 180, FIG. 1.

In operation 410, the import/export manager can determine, based on the import-tape data obtained in operation 405, whether one or more unaddressed files are stored on the tape having the import status. An unaddressed file stored on the tape having the import status can refer to a file for which the import/export manager has not performed operation 415. If one or more unaddressed files are stored on the tape having the import status, then the import/export manager can proceed to operation 412. Alternatively, if no unaddressed files are stored on the tape having the import status, then the import/export manager can proceed to operation 440 and subsequently end.

In operation 440, the import/export manager can initiate an import of the tape having the import status. For example, in some embodiments, initiating an import can include the import/export manager issuing a command to the storage management system to take over control and/or management of the tape.

In operation 412, the import/export manager can select a file stored on the tape having the import status. In some embodiments, selecting a file can include the import/export manager identifying a file for which the import/export manager can perform one or more of operations 415 through 435, discussed below.

In operation 415, the import/export manager can determine if a stub file corresponding to the selected file and to the tape having the import status is stored within the storage management system. In some embodiments, operation 415 can include the import/export manager obtaining stub file location data from extended attributes of a file stored on the tape having the import status. For example, in some embodiments, the import/export manager can obtain stub file location data from extended attributes of the selected file. Operation 415 can further include the import/export manager determining whether a stub file is stored in a location indicated by the stub file location data. If a stub file is stored in the location indicated by the stub file location data, then the import/export manager can proceed to operation 420. Alternatively, if a stub file is not stored in the location indicated by the stub file location data, then the import/export manager can proceed to operation 435.

In operation 420, the import/export manager can determine whether the stub file found in operation 415 includes tape identification data corresponding to the tape having the import status. In some embodiments, such tape identification data can be included in extended attributes of the stub file. If the stub file includes tape identification data corresponding to the tape having the import status, then the import/export manager can proceed to operation 425. Alternatively, if the stub file does not include tape identification data corresponding to the tape having the import status, then the import/export manager can proceed to operation 435.

In operation 425, the import/export manager can determine whether modification data corresponding to the selected file is unchanged. For example, in some embodiments, operation 425 can include the import/export manager obtaining first modification data from extended attributes of the stub file found in operation 415. Continuing with this example, the first modification data can include a modification time and/or a modification date (e.g., a time and/or a date on which the selected file was modified). Continuing with this example, the first modification data can be compared to second modification data (e.g., a modification time and/or a modification date included in metadata of the selected file). If the first modification data matches the second modification data (e.g., the modification times and/or the modification dates are identical), then the import/export manager can determine that the first modification data is unchanged and that the selected file has an unmodified status.

If the import/export manager determines that the first modification data is unchanged, then the import/export manager can proceed to operation 430. Alternatively, if the import/export manager determines that the first modification data is changed (e.g., in the comparison discussed above, the modification times and/or the modification dates are not identical), then the import/export manager can determine that the selected file has a modified status. Additionally, if the import/export manager determines that the modification data is changed, then the import/export manager can proceed to operation 435.

In operation 430, the import/export manager can initiate a change to the pointer data included in the stub file. Particularly, in operation 430, the import/export manager can modify the pointer data to include a pointer to the tape having the import status. In some embodiments, operation 430 can include the import/export manager issuing a command to the storage management system to generate a pointer and add the pointer to the pointer data of the stub file.

In operation 435, the import/export manager can initiate the creation of a new stub file. The new stub file can include a pointer to the selected file having the modified status. In some embodiments, operation 435 can include the import/export manager issuing a command to the storage management system to create a new stub file. In some embodiments, the storage management system can store the new stub file on a computer system (e.g., computer system 120, FIG. 1).

Figure 5:
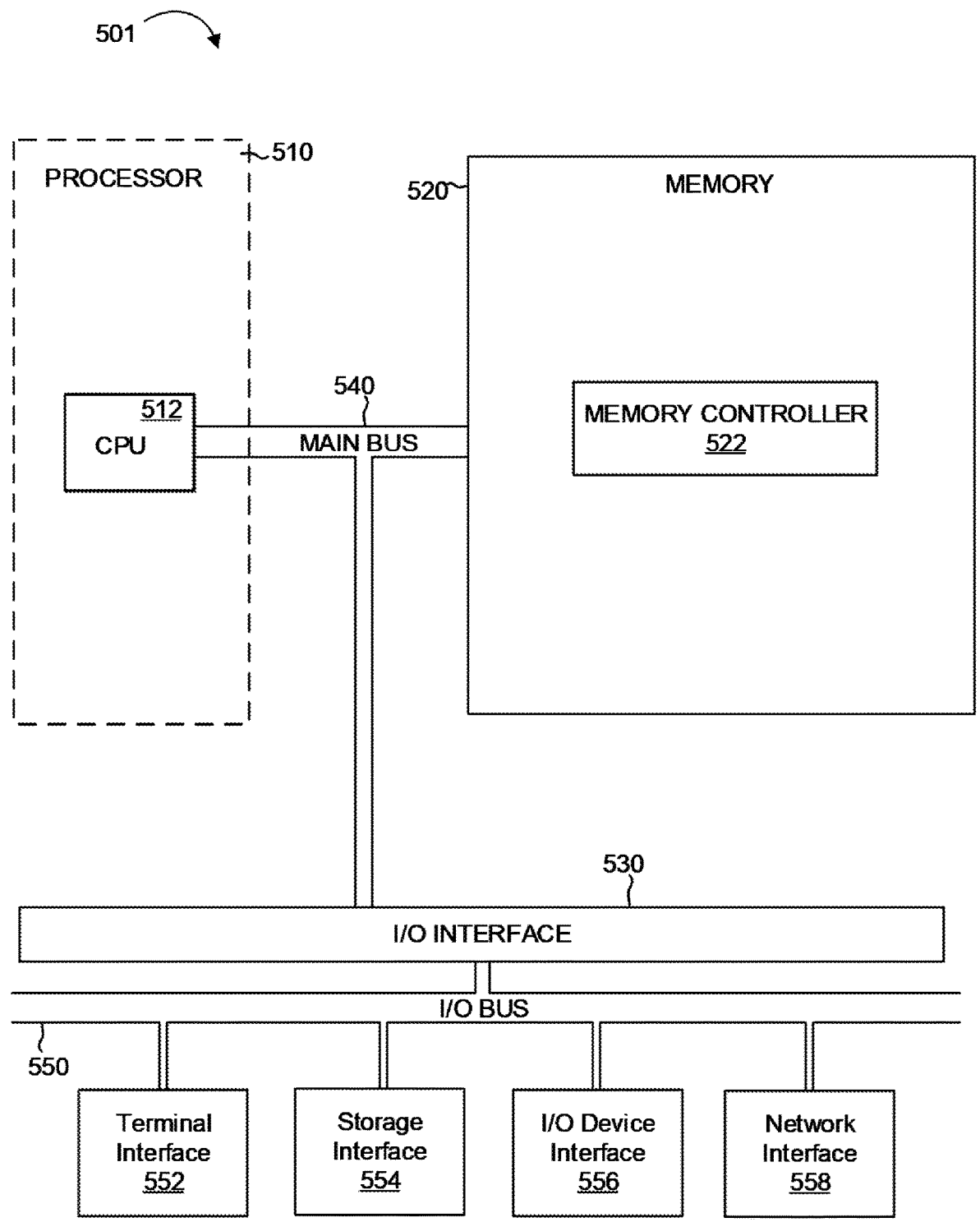
FIG. 5 depicts the representative major components of a computer system that can be used in accordance with embodiments of the present disclosure.

FIG. 5 illustrates the representative major components of an exemplary Computer System 501 that can be used in accordance with embodiments of the present disclosure. The particular components depicted are presented for the purpose of example only and are not necessarily the only such variations. The Computer System 501 can comprise a Processor 510, Memory 520, an Input/Output Interface (also referred to herein as I/O or I/O Interface) 530, and a Main Bus 540. The Main Bus 540 can provide communication pathways for the other components of the Computer System 501. In some embodiments, the Main Bus 540 can connect to other components such as a specialized digital signal processor (not depicted).

The Processor 510 of the Computer System 501 can be comprised of one or more CPUs 512. The Processor 510 can additionally be comprised of one or more memory buffers or caches (not depicted) that provide temporary storage of instructions and data for the CPU 512. The CPU 512 can perform instructions on input provided from the caches or from the Memory 520 and output the result to caches or the Memory 520. The CPU 512 can be comprised of one or more circuits configured to perform one or methods consistent with embodiments of the present disclosure. In some embodiments, the Computer System 501 can contain multiple Processors 510 typical of a relatively large system. In other embodiments, however, the Computer System 501 can be a single processor with a singular CPU 512.

The Memory 520 of the Computer System 501 can be comprised of a Memory Controller 522 and one or more memory modules for temporarily or permanently storing data (not depicted). In some embodiments, the Memory 520 can comprise a random-access semiconductor memory, storage device, or storage medium (either volatile or nonvolatile) for storing data and programs. The Memory Controller 522 can communicate with the Processor 510, facilitating storage and retrieval of information in the memory modules. The Memory Controller 522 can communicate with the I/O Interface 530, facilitating storage and retrieval of input or output in the memory modules. In some embodiments, the memory modules can be dual in-line memory modules.

The I/O Interface 530 can comprise an I/O Bus 550, a Terminal Interface 552, a Storage Interface 554, an I/O Device Interface 556, and a Network Interface 558. The I/O Interface 530 can connect the Main Bus 540 to the I/O Bus 550. The I/O Interface 530 can direct instructions and data from the Processor 510 and Memory 520 to the various interfaces of the I/O Bus 550. The I/O Interface 530 can also direct instructions and data from the various interfaces of the I/O Bus 550 to the Processor 510 and Memory 520. The various interfaces can comprise the Terminal Interface 552, the Storage Interface 554, the I/O Device Interface 556, and the Network Interface 558. In some embodiments, the various interfaces can comprise a subset of the aforementioned interfaces (e.g., an embedded computer system in an industrial application may not include the Terminal Interface 552 and the Storage Interface 554).

Logic modules throughout the Computer System 501—including but not limited to the Memory 520, the Processor 510, and the I/O Interface 530—can communicate failures and changes to one or more components to a hypervisor or operating system (not depicted). The hypervisor or the operating system can allocate the various resources available in the Computer System 501 and track the location of data in Memory 520 and of processes assigned to various CPUs 512. In embodiments that combine or rearrange elements, aspects of the logic modules' capabilities can be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
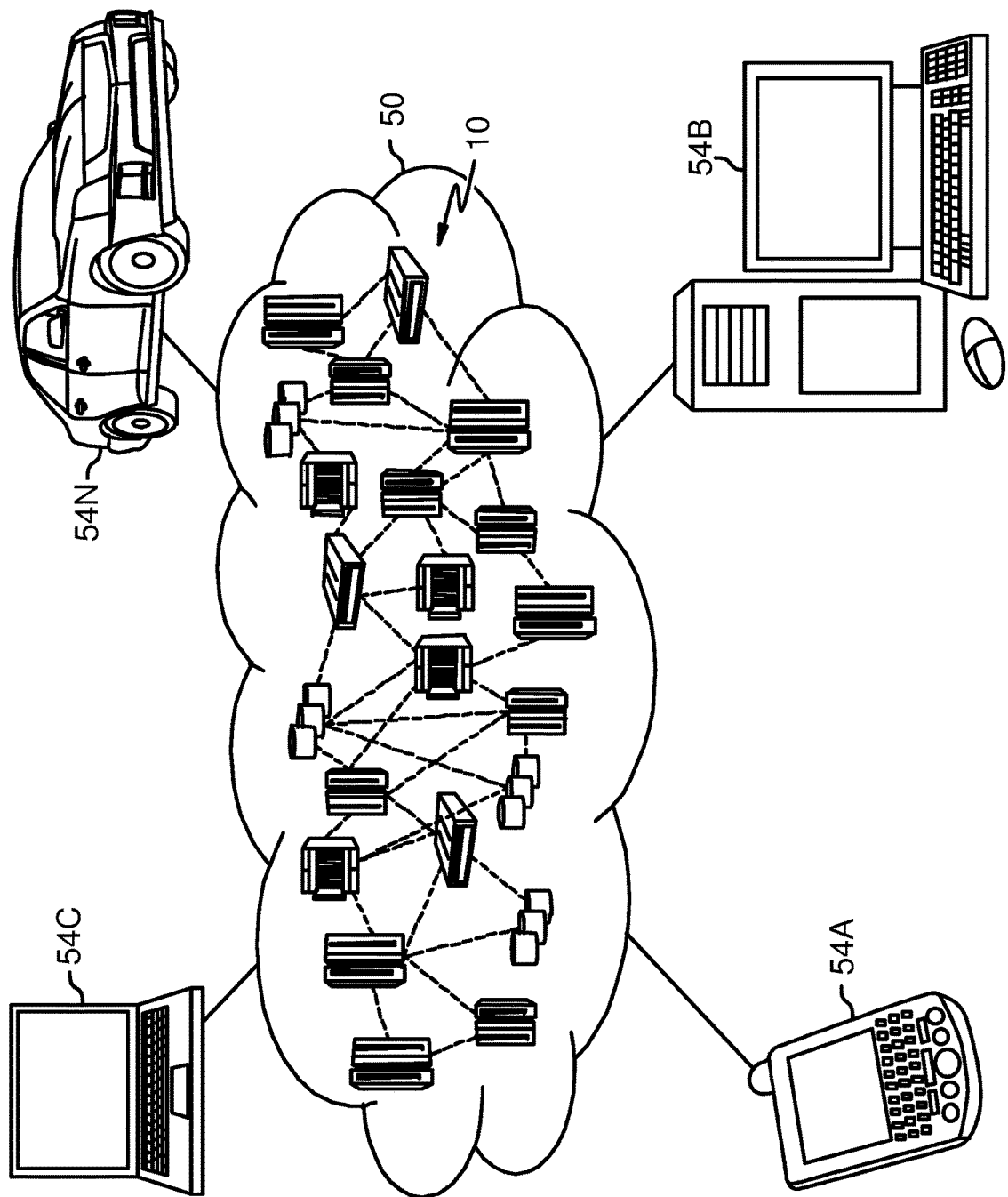
FIG. 6 depicts a cloud computing environment according to embodiments of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
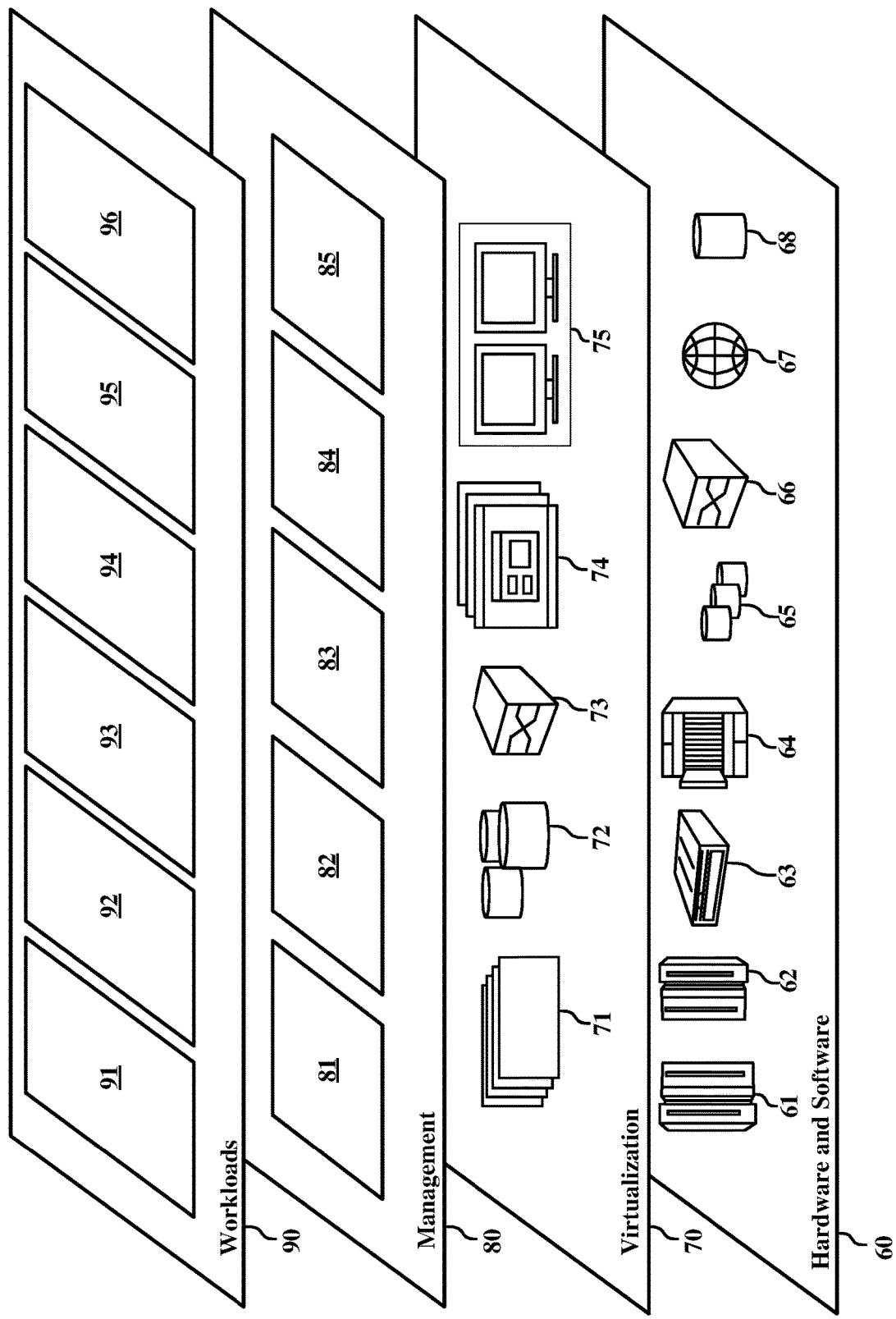
FIG. 7 depicts abstraction model layers according to embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and import/export management logic 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
   obtaining tape data for one or more tapes, the tape data including pointer data corresponding to a first file;
   determining, based on the tape data, that the first file is stored on a first tape of the one or more tapes, the first tape having an export status;
   determining that the pointer data includes a pointer to the first tape and a pointer to a second tape, the second tape having a non-export status;
   in response to the determining that the pointer data includes the pointer to the first tape and the pointer to the second tape:
      storing at least a portion of the tape data; and
      initiating, based on the first tape having the export status, a deactivation of the pointer to the first tape.

2. The computer-implemented method of claim 1, wherein the storing the at least a portion of the tape data comprises storing, on the first tape, file location data corresponding to the pointer data.

3. The computer-implemented method of claim 2, wherein the storing the file location data corresponding to the pointer data comprises storing a file location for a first stub file;
wherein the first stub file includes the pointer data; and
wherein the first stub file corresponds to the first file.

4. The computer-implemented method of claim 1, wherein the storing the at least a portion of the tape data comprises storing tape identification data of the first tape.

5. The computer-implemented method of claim 4, further comprising:
storing the tape identification data to a first stub file corresponding to the first file.

6. The computer-implemented method of claim 1, wherein the storing the at least a portion of the tape data comprises storing first file modification data of the first file.

7. The computer-implemented method of claim 6, further comprising:
storing the first file modification data to a first stub file corresponding to the first file.

8. A computer-implemented method comprising:
obtaining import-tape data for a first tape, the first tape having an import status, the import-tape data including a file location for a first stub file, the first stub file corresponding to a first file;
determining, based on the import-tape data, that the first file is stored on the first tape;
determining that the first stub file is stored in the file location; and
initiating a change to pointer data included in the first stub file, the change comprising modifying the pointer data to include a pointer to the first tape.

9. The computer-implemented method of claim 8, further comprising determining that the first stub file further includes tape identification data of the first tape.

10. The computer-implemented method of claim 8, wherein the first stub file further includes first file modification data of the first file;
obtaining the first file modification data; and
determining, based on the first file modification data, that the first file has an unmodified status.

11. The computer-implemented method of claim 10, wherein the first file modification data includes a first file modification time of the first file, and
wherein the determining that the first file has an unmodified status comprises determining that the first file modification time matches a second file modification time of the first file.

12. The computer-implemented method of claim 8, wherein the obtaining the import-tape data includes obtaining the file location from the first tape.

13. A computer-implemented method comprising:
obtaining tape data for one or more tapes, the tape data including pointer data corresponding to a first file;
determining, based on the tape data, that the first file is stored on a first tape of the one or more tapes, the first tape having an export status at a first time;
determining that the pointer data includes a pointer to the first tape and a pointer to a second tape, the second tape having a non-export status;
in response to the determining that the pointer data includes the pointer to the first tape and the pointer to the second tape:
storing at least a portion of the tape data, and
initiating, based on the first tape having the export status, a deactivation of the pointer to the first tape;
obtaining import-tape data for the first tape, the first tape having an import status at a second time, the import-tape data including a file location for a first stub file, the first stub file corresponding to the first file;
determining, based on the import-tape data, that the first file is stored on the first tape;
determining that the first stub file is stored in the file location; and
initiating a change to pointer data included in the first stub file, the change comprising modifying the pointer data to include a pointer to the first tape.

14. The computer-implemented method of claim 13, wherein the storing the at least a portion of the tape data comprises storing, on the first tape, the file location for the first stub file.

15. The computer-implemented method of claim 13, wherein the storing the at least a portion of the tape data comprises storing tape identification data of the first tape.

16. The computer-implemented method of claim 15, further comprising determining that the first stub file further includes the tape identification data of the first tape.

17. The computer-implemented method of claim 13, wherein the storing the at least a portion of the tape data comprises storing first file modification data of the first file.

18. The computer-implemented method of claim 17, further comprising storing the first file modification data to the first stub file.

19. The computer-implemented method of claim 17, further comprising:
obtaining the first file modification data; and
determining, based on the first file modification data, that the first file has an unmodified status.

20. The computer-implemented method of claim 19, wherein the first file modification data includes a first file modification time of the first file; and
wherein the determining that the first file has an unmodified status comprises determining that the first file modification time matches a second file modification time of the first file.

* * * * *